United States Patent
Li et al.

(10) Patent No.: US 11,838,915 B2
(45) Date of Patent: Dec. 5, 2023

(54) ONE-SHOT FEEDBACK AND SCELL DORMANCY BEHAVIOR IN 5G NR NETWORKS

(71) Applicant: Intel Corporation, Santa Clara, CA (US)

(72) Inventors: Yingyang Li, Beijing (CN); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 17/172,606

(22) Filed: Feb. 10, 2021

(65) Prior Publication Data

US 2021/0168776 A1 Jun. 3, 2021

Related U.S. Application Data

(60) Provisional application No. 62/975,575, filed on Feb. 12, 2020, provisional application No. 62/976,917, filed on Feb. 14, 2020.

(51) Int. Cl.
*H04W 72/12* (2023.01)
*H04W 72/23* (2023.01)
*H04W 74/08* (2009.01)
*H04L 1/1812* (2023.01)

(52) U.S. Cl.
CPC ........... *H04W 72/23* (2023.01); *H04L 1/1812* (2013.01); *H04W 74/0808* (2013.01)

(58) Field of Classification Search
CPC ... H04L 1/1812; H04L 1/1822; H04L 1/1861; H04L 1/1896; H04L 1/1854; H04W 72/23; H04W 74/0808
See application file for complete search history.

(56) References Cited

U.S. PATENT DOCUMENTS

11,398,884 B2 * 7/2022 Gou ...................... H04L 1/1887
2017/0207895 A1 * 7/2017 Yang ..................... H04W 72/23
(Continued)

*Primary Examiner* — Lan-Huong Truong
(74) *Attorney, Agent, or Firm* — Schwegman Lundberg & Woessner, P.A.

(57) ABSTRACT

Embodiments of a user equipment (UE) configured for new-radio (NR) operations in a fifth-generation (5G) system (5GS) may be configured to detect a downlink-control information (DCI) format that includes a one-shot hybrid automatic repeat request acknowledgement (HARQ-ACK) request field and a frequency domain resource assignment field (FDRA). The one-shot HARQ-ACK request field may indicate whether one-shot HARQ-ACK feedback is triggered. The UE may decode the FDRA field to determine whether the FDRA field indicates a valid frequency resource or whether the FDRA field indicates a special value and may also be configured to determine whether or not a physical downlink shared channel (PDSCH) is scheduled by the DCI format and whether or not secondary cell (SCell) dormancy switching is triggered based on both the one-shot HARQ-ACK request field and the FDRA field. The UE may also encode a HARQ-ACK transmission on a physical uplink control channel (PUCCH). The HARQ-ACK transmission may be encoded to include HARQ-ACK feedback for PDSCH transmissions for all HARQ processes of a cell when the one-shot HARQ-ACK feedback is triggered.

18 Claims, 4 Drawing Sheets

(56) References Cited

U.S. PATENT DOCUMENTS

| | | | |
|---|---|---|---|
| 2019/0150122 A1* | 5/2019 | Ying | H04W 72/23 |
| | | | 370/329 |
| 2020/0245354 A1* | 7/2020 | Kazmi | H04W 74/0808 |
| 2021/0143970 A1* | 5/2021 | Xu | H04L 5/0098 |
| 2021/0211908 A1* | 7/2021 | Jiang | H04L 5/0051 |
| 2023/0043604 A1* | 2/2023 | Lee | H04L 1/1854 |

* cited by examiner

FIG. 2

ONE-SHOT FEEDBACK AND SCELL DORMANCY BEHAVIOR IN 5G NR NETWORKS

PRIORITY CLAIM

This application claims priority under 35 U.S.C. 119(e) to U.S. Provisional Patent Application Ser. No. 62/975,575, filed Feb. 12, 2020 [reference number AC7966-Z], and U.S. Provisional Patent Application Ser. No. 62/976,917, filed Feb. 14, 2020 [reference number AC8060-Z], each of which is incorporated herein by reference in its entirety.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to Type-3 HARQ-ACK codebook determination.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for new-radio (NR) operations in a fifth-generation (5G) system (5GS). In these embodiments, the UE may be configured to detect a downlink-control information (DCI) format, the DCI format including a one-shot hybrid automatic repeat request acknowledgement (HARQ-ACK) request field and a frequency domain resource assignment (FDRA) field. In these embodiments, the one-shot HARQ-ACK request field may indicate whether one-shot HARQ-ACK feedback is triggered. In these embodiments, the UE may decode the FDRA field to determine whether the FDRA field indicates a valid frequency resource or whether the FDRA field indicates a special (e.g., predetermined) value. The UE may also be configured to determine whether or not a physical downlink shared channel (PDSCH) is scheduled by the DCI format and whether or not secondary cell (SCell) dormancy switching is triggered based on both the one-shot HARQ-ACK request field and the FDRA field. In these embodiments, the UE may also encode a HARQ-ACK transmission on a physical uplink control channel (PUCCH). The HARQ-ACK transmission may be encoded to include HARQ-ACK feedback for PDSCH transmissions for all HARQ processes of a cell when the one-shot HARQ-ACK feedback is triggered.

In some embodiments, when the one-shot HARQ-ACK feedback is triggered by the DCI format and the FDRA field is the special value, the SCell dormancy switching is not triggered by the DCI format and the PDSCH transmission is not scheduled. In some embodiments, when the one-shot HARQ-ACK feedback is triggered by the DCI format and the FDRA field indicates a valid frequency resource, the PDSCH transmission is scheduled and SCell dormancy switching is indicated by an SCell dormancy indication field in the DCI format when configured. In some embodiments, when the one-shot HARQ-ACK feedback is not triggered by the DCI format and the FDRA field is the special value, SCell dormancy switching is indicated without scheduling the PDSCH transmission, the SCell dormancy switching being indicated by repurposed fields in the DCI format. In some embodiments, when the one-shot HARQ-ACK feedback is not triggered by the DCI format and the FDRA field indicates a valid frequency resource, the PDSCH transmission is scheduled by the DCI format and the SCell dormancy switching is indicated by the SCell dormancy indication field in the DCI format when configured.

In some embodiments, the DC format is DCI format 1_1, and the UE is provided search space sets to monitor a physical downlink control channel (PDCCH) for detection of the DCI format 1_1.

In some embodiments, when the one-shot HARQ-ACK request field has a value of '1', the one-shot HARQ-ACK feedback is triggered, and when the one-shot HARQ-ACK request field has a value of '0', the one-shot HARQ-ACK feedback is not triggered.

In some embodiments, when the SCell dormancy switching is indicated: an activated SCell is switched into a dormant BWP (e.g., to save power); or a dormant SCell is switched into an non-dormant BWP (e.g., in response to increased traffic).

In some embodiments, for unlicensed spectrum operation, the UE may be configured to encode the HARQ-ACK transmission on a PUCCH on an unlicensed carrier after performing a listen-before-talk (LBT) process. In some embodiments, for the HARQ-ACK feedback, the UE is configured with a dynamic HARQ-ACK codebook or an enhanced HARQ-ACK codebook is configured. In some embodiments, the repurposed fields include an HARQ process field.

In some embodiments, when the one-shot HARQ-ACK feedback is not triggered, HARQ processes are not used in the HARQ-ACK codebook generation. In these embodiments, the UE may generate a HARQ-ACK codebook following a different logic from one-shot feedback. In some embodiments, when the one-shot HARQ-ACK feedback is triggered, the UE may be configured to multiplex only a Type-3 HARQ-ACK codebook in a PUCCH or a PUSCH for transmission in the slot, otherwise, the UE may be configured to refrain from multiplexing corresponding HARQ-ACK information in a PUCCH or PUSCH transmission.

These embodiments are described in more detail below.

Figure 1A:
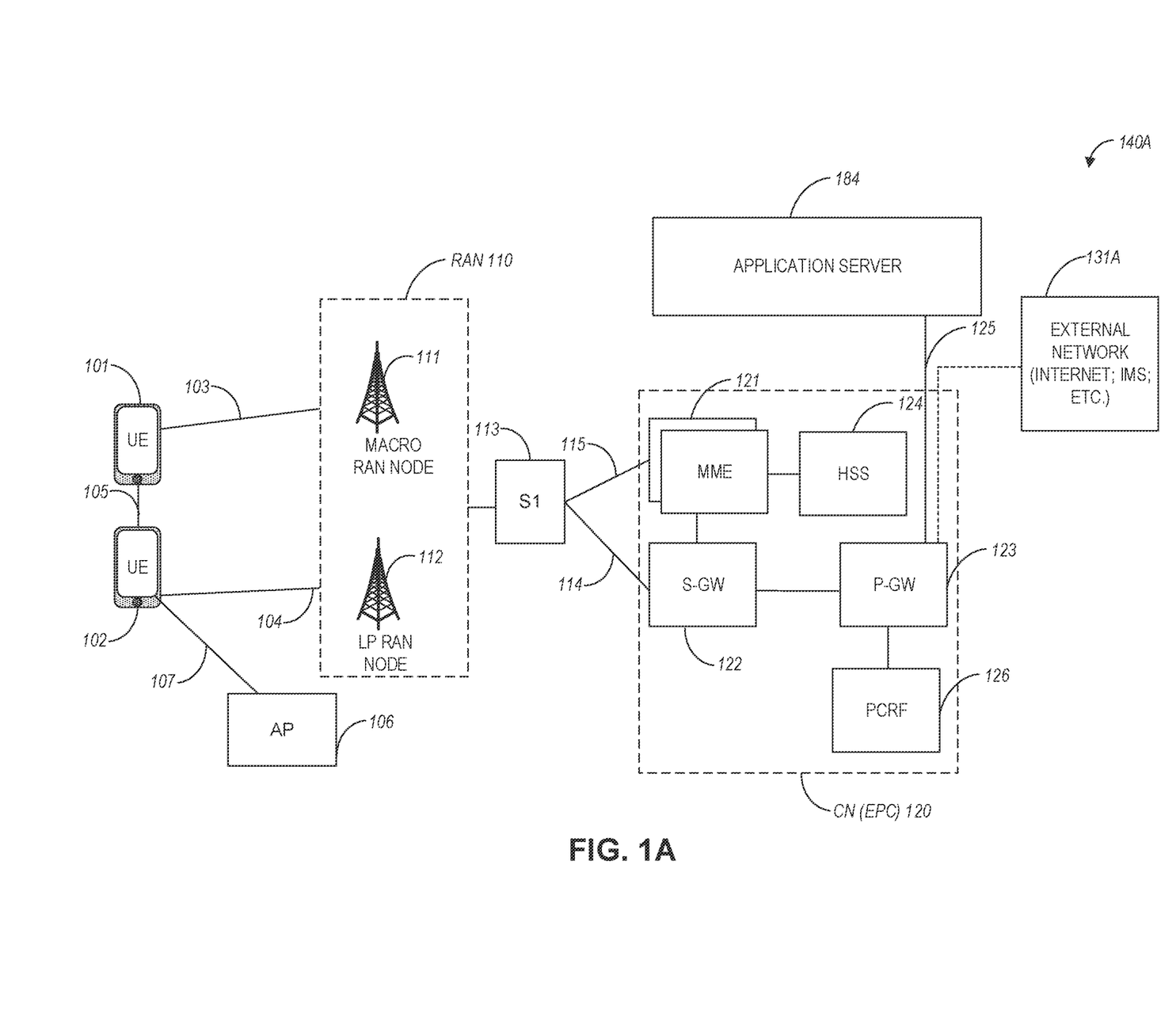
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
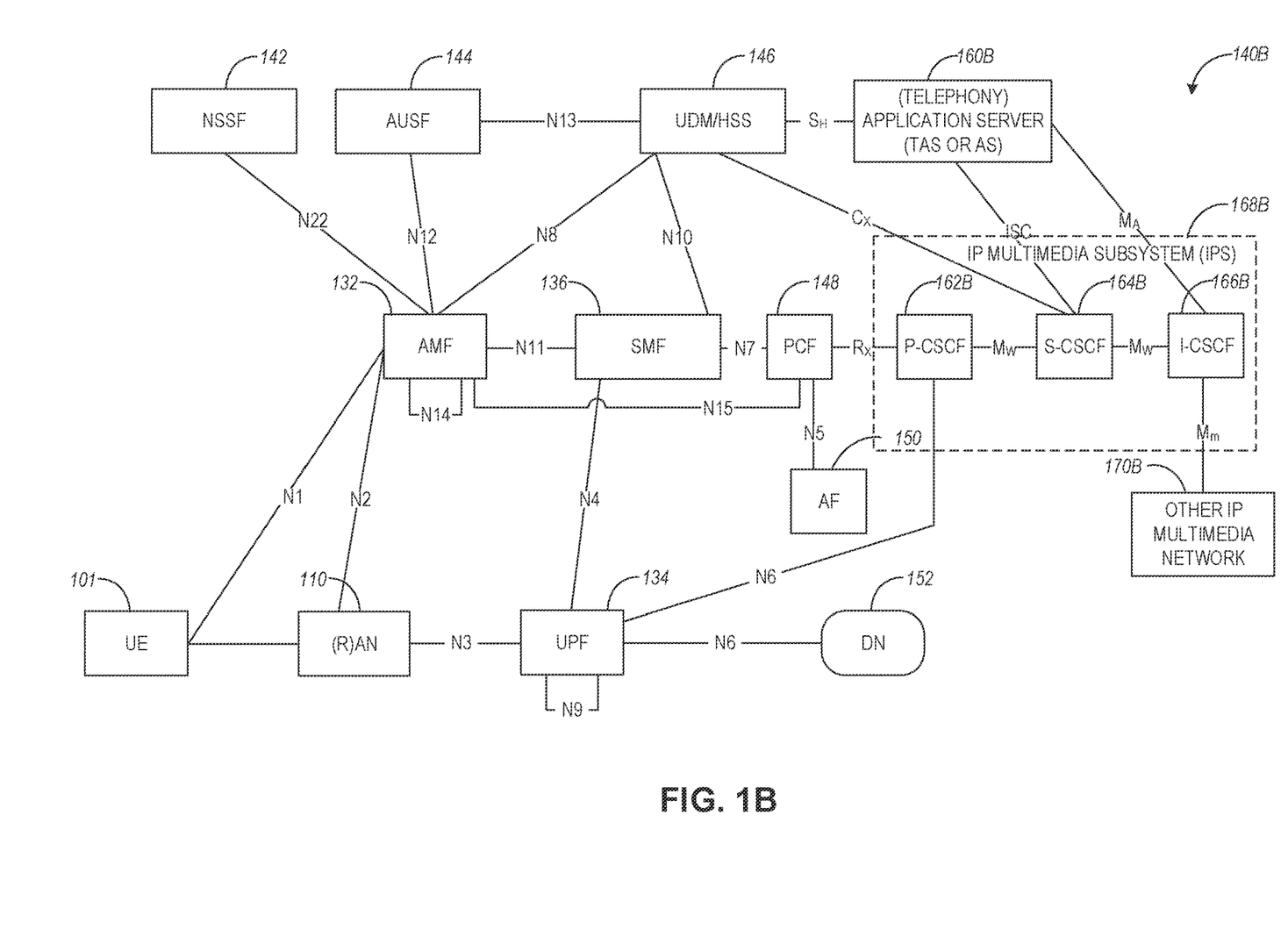
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
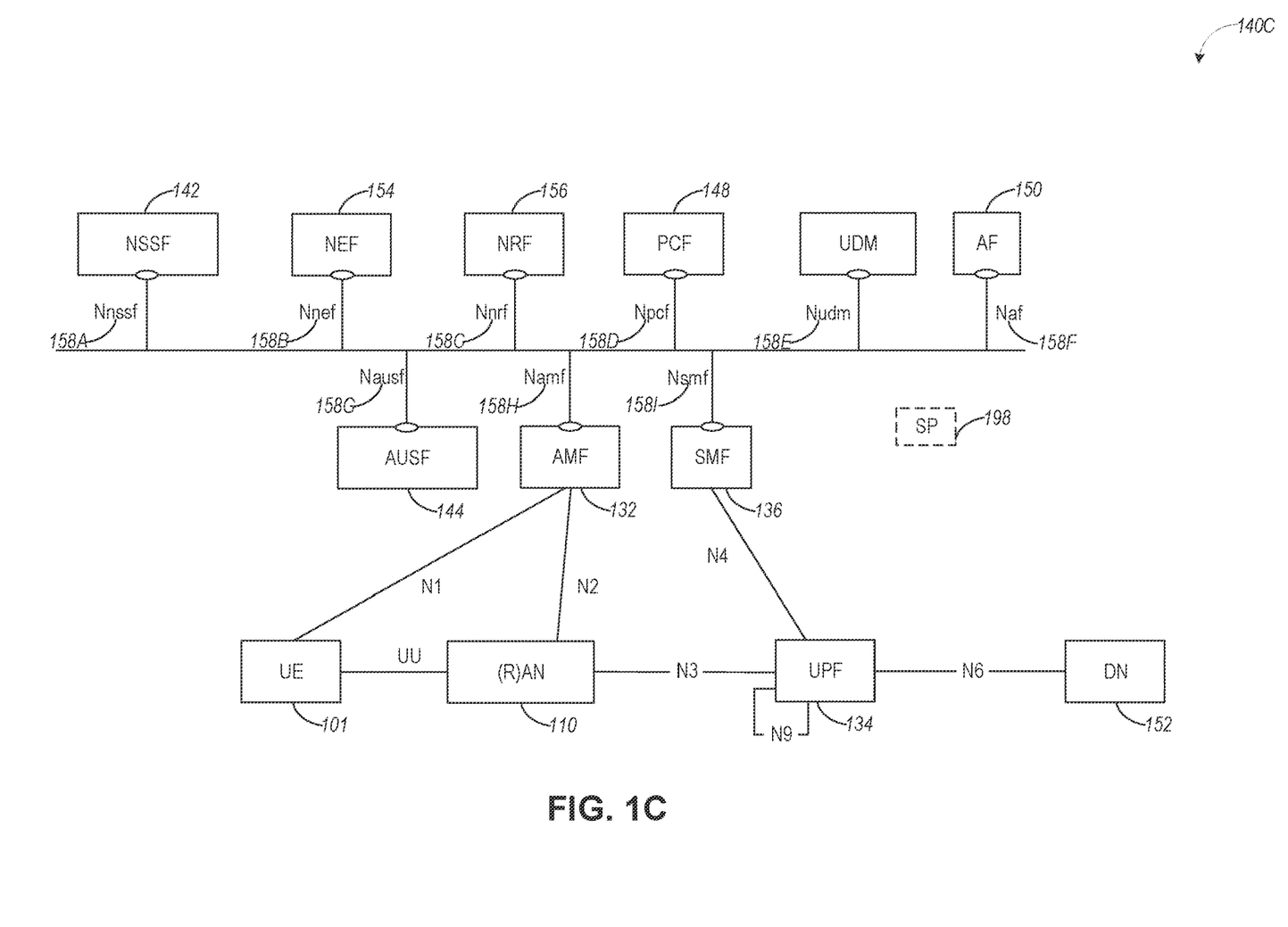

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the ANF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 2:
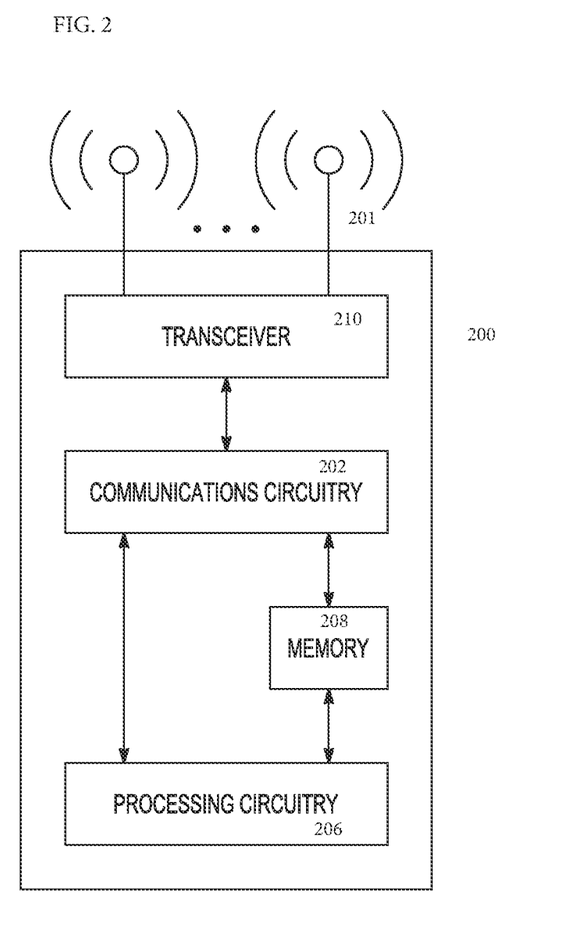
FIG. 2 is a block diagram of a wireless communication device in accordance with some embodiments.

In one embodiment, FIG. 2 illustrates a functional block diagram of a communication device or station that may be suitable for use as an UE or other user device in accordance with some embodiments. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple, and seamless wireless connectivity solutions. NR will enable everything connected by wireless and deliver fast, rich contents and services.

Carrier aggregation (CA) is one of the main schemes to increase data rate from system perspective and UE perspective. Though the key motivation is high data rate, energy efficiency is also a critical metric. Therefore, in MR-DC & eCA WI in NR Rel-16, SCell dormancy behavior was introduced. If there is no much traffic, an activated SCell could be switched into a dormant BWP to save power, which also allow a quick switching into non-dormant BWP right after more traffics arrive. As agreed in the WI, DCI format 1_1 could indicate SCell dormancy switching with or without scheduling a PDSCH transmission.

Another promising technique for 5G system is the use of unlicensed spectrum. The licensed spectrum may be still used for service with strict QoS requirement, while some other services could be served by unlicensed operation for offloading. Additionally, NR unlicensed operation also supports standalone operation. Therefore, HARQ-ACK transmission on PUCCH on unlicensed carrier is supported. HARQ-ACK transmission is enhanced considering two aspects:

UE may fail to do uplink (UL) LBT to start a PUCCH transmission which is indicated by PUCCH resource indication and PDSCH-to-HARQ-ACK delay in the DCI scheduling a PDSCH. Even UE successfully transmits a PUCCH carrying HARQ-ACK, gNB may fail to decode it due to the potential hidden node problem at gNB side or other issues.

To address the above two cases, enhanced HARQ-ACK transmission include one-shot HARQ-ACK feedback was introduced. In one-shot feedback, UE fixedly report HARQ-ACK for all HARQ processes of a cell, so that gNB can get all HARQ-ACK information of PDSCH transmissions. The DCI format 1_1 triggering one-shot feedback may or may not schedule a PDSCH or not schedule a PDSCH.

If the feature of SCell dormancy operation and NR unlicensed operation are both enabled for a UE, it needs a joint design to simultaneously support DCI 1_1 indicating SCell dormancy switching and one-shot feedback.

In accordance with embodiments, in a NR system operating on NR-NR DC, DCI format 1_1 is design to support SCell dormancy switching and one-shot HARQ-ACK feedback.

In MR-DC & eCA WI, SCell dormancy behavior was introduced. DCI format 1_1 could indicate SCell dormancy switching with or without scheduling a PDSCH transmission. A special value of frequency domain resource allocation (FDRA) field in DCI format 1_1 indicates that no PDSCH transmission is scheduled and SCell dormancy switching is indicated.

all bits of FDRA are set to '0' for resource allocation type 0, or all bits of FDRA are set to ' 1' for resource allocation type 1.

If FDRA is set to the above special value(s), the following fields in DCI format 1_1 could be repurposed to indicate SCell dormancy switching per SCell, which provide at least 17 bits for the indication. Since only up to 15 SCells can be configured for a UE, there are still 2 bits that are not occupied.

Modulation and coding scheme of transport block 1 (5 bits)

New data indicator of transport block 1 (1 bit)

Redundancy version of transport block 1 (2 bits)

HARQ process number (4 bits)

Antenna port(s) (at least 4 bits)

DMRS sequence initialization (1 bit)

In NR unlicensed WI, a DCI format 1_1 could indicate one-shot HARQ-ACK feedback with or without scheduling a PDSCH transmission. There is a 1-bit one-shot HARQ-ACK request field in DCI 1_1 which indicate whether one-shot HARQ-ACK is triggered or not. If one-shot feedback is triggered, a special value of FDRA could be used to indicate that there is no scheduled PDSCH. The same special value of FDRA as SCell dormancy indication could be applicable.

Since a NR unlicensed cell could also operates as a PCell, it is expected that a UE may simultaneously enable SCell dormancy indication and NR unlicensed operation on PCell. In this case, a joint design of SCell dormancy indication and one-shot feedback is needed. DCI format 1_1 is taken as example in the descriptions. The same principle could be extended to other DCI format.

In some embodiments, one-shot HARQ-ACK feedback and SCell dormancy switching are not indicated at same time by DCI format 1_1.

If one-shot HARQ-ACK request is set to '0', one-shot feedback is not triggered, and SCell dormancy switching could be indicated by DCI format 1_1.

If special value of FDRA is indicated, it triggers SCell dormancy switching without PDSCH scheduling. SCell dormancy switching is indicated by repurposing some fields in DCI format 1_1.

Otherwise, if FDRA indicate a valid frequency resource, PDSCH transmission is scheduled and the SCell dormancy behavior could be indicated by an indicator X, if configured, e.g. SCell dormancy indication field in DCI format 1_1.

If one-shot HARQ-ACK request is set to '1', one-shot feedback is triggered, however SCell dormancy switching is not indicated by the DCI format 1_1.

If special value of FDRA is indicated, it triggers one-shot feedback without PDSCH scheduling.

Otherwise, if FDRA indicate a valid frequency resource, it triggers one-shot feedback with PDSCH scheduling.

The above operations are summarized in Table 1A.

TABLE 1A

Indication of one-shot feedback and SCell dormancy switching

| FDRA | DCI one-shot request | Data transmission | One-shot feedback | Dormancy switching |
|---|---|---|---|---|
| Special value | 1 | NO | YES | NO |
| Special value | 0 | NO | NO | By repurposed fields |
| valid FDRA | 1 | YES | YES | NO |
| valid FDRA | 0 | YES | NO | By indicator X, if configured |

In some embodiments, when PDSCH is not scheduled, one-shot HARQ-ACK feedback and SCell dormancy switching are not indicated at same time by DCI format 1_1.

If one-shot HARQ-ACK request is set to '0', one-shot feedback is not triggered, and SCell dormancy switching could be indicated by DCI format 1_1.

If special value of FDRA is indicated, it triggers SCell dormancy switching without PDSCH scheduling. SCell dormancy switching is indicated by repurposing some fields in DCI format 1_1.

Otherwise, if FDRA indicate a valid frequency resource, PDSCH transmission is scheduled and the SCell dormancy behavior could be indicated by an indicator X, if configured, e.g. SCell dormancy indication field in DCI format 1_1.

If one-shot HARQ-ACK request is set to '1', one-shot feedback is triggered.

If special value of FDRA is indicated, PDSCH transmission is not scheduled and SCell dormancy switching is not indicated by the DCI format 1_1.

Otherwise, if FDRA indicate a valid frequency resource, PDSCH transmission is scheduled and SCell dormancy behavior could be indicated by an indicator X, if configured, e.g. SCell dormancy indication field in DCI format 1_1.

The above operations are summarized in Table 1B.

TABLE 1B

Indication of one-shot feedback and SCell dormancy switching

| FDRA | DCI one-shot request | Data transmission | One-shot feedback | Dormancy switching |
|---|---|---|---|---|
| Special value | 1 | NO | YES | NO |
| Special value | 0 | NO | NO | By repurposed fields |
| valid FDRA | 1 | YES | YES | By indicator X, if configured |
| valid FDRA | 0 | YES | NO | By indicator X, if configured |

In some embodiments, when PDSCH is not scheduled, one-shot HARQ-ACK feedback and SCell dormancy switching could be indicated at same time by DCI format 1_1.

If one-shot HARQ-ACK request is set to '0', one-shot feedback is not triggered by DCI format 1_1 and SCell dormancy switching could be indicated.

If special value of FDRA is indicated, it triggers SCell dormancy switching without PDSCH scheduling. SCell dormancy switching is indicated by repurposing some fields in DCI format 1_1.

Otherwise, if FDRA indicate a valid frequency resource, PDSCH transmission is scheduled and the SCell dormancy behavior could be indicated by an indicator X, if configured, e.g. SCell dormancy indication field in DCI format 1_1.

If one-shot HARQ-ACK request is set to '1', one-shot feedback is triggered, while SCell dormancy switching is also indicated by the DCI format 1_1.

If FDRA indicate a valid frequency resource, PDSCH transmission is scheduled and SCell dormancy switching is indicated by an indicator X, if configured, e.g. SCell dormancy indication field.

Otherwise, if special value of FDRA is indicated, PDSCH transmission is not scheduled and SCell dormancy switching is indicated by repurposing some fields in DCI format 1_1. If the dormancy indication by the repurposed fields are same as the current dormancy status of the SCells, dormancy switching is effectively not triggered.

The above operations are summarized in Table 2.

TABLE 2

Indication of one-shot feedback and SCell dormancy switching

| FDRA | DCI one-shot request | Data transmission | One-shot feedback | Dormancy switching |
|---|---|---|---|---|
| Special value | 1 | NO | YES | By repurposed fields |
| valid | 1 | YES | YES | By indicator X, |

TABLE 2-continued

Indication of one-shot feedback and SCell dormancy switching

| FDRA | DCI one-shot request | Data transmission | One-shot feedback | Dormancy switching |
|---|---|---|---|---|
| FDRA Special value | 0 | NO | NO | if configured By repurposed fields |
| valid FDRA | 0 | YES | NO | By indicator X, if configured |

Assuming dynamic HARQ-ACK codebook or enhanced HARQ-ACK codebook is configured, if one-shot feedback is triggered without scheduled PDSCH, and if SCell dormancy switching is also indicated, a value ACK is not reported for a DCI carrying SCell dormancy switching indication since HARQ process number field is repurposed for SCell dormancy indication.

Assuming dynamic HARQ-ACK codebook or enhanced HARQ-ACK codebook is configured, and if a DCI triggers both one-shot feedback and SCell dormancy switching, the presence of one-shot HARQ-ACK transmission implicitly indicates the correct reception of the DCI for SCell dormancy switching. In this way, no explicit ACK for the DCI carrying SCell dormancy switching indication needs to be included.

Assuming dynamic HARQ-ACK codebook or enhanced HARQ-ACK codebook is configured, if one-shot feedback is triggered without scheduled PDSCH, and if SCell dormancy switching is also indicated, a value ACK for a DCI carrying SCell dormancy switching can still be included in HARQ-ACK codebook. Certain fields could be repurposed as HARQ process number which is used in forming one-shot feedback codebook. For example, there are at least 2 unused bits in the following fields except for the up to 15 bits for SCell dormancy switching indication,     Modulation and coding scheme of transport block 1 (5 bits)
    New data indicator of transport block 1 (1 bit)
    Redundancy version of transport block 1 (2 bits)
    HARQ process number (4 bits)
    Antenna port(s) (at least 4 bits)
    DMRS sequence initialization (1 bit)

Further, there must be a 2-bit C-DAI field configured in DCI 1_1 since it is present for both dynamic and enhanced dynamic codebook. Therefore, 4 bits are available and could be repurposed as HARQ process number.

In some embodiments, when PDSCH is not scheduled, one-shot HARQ-ACK feedback and SCell dormancy switching could be indicated at same time by DCI format 1_1.

If one-shot HARQ-ACK request is set to '0', one-shot feedback is not triggered by DCI format 1_1 and SCell dormancy switching could be indicated.

If special value of FDRA is indicated, it triggers SCell dormancy switching without PDSCH scheduling. SCell dormancy switching is indicated by repurposing some fields in DCI format 1_1.

Otherwise, if FDRA indicate a valid frequency resource, PDSCH transmission is scheduled and the SCell dormancy behavior could be indicated by an indicator X, if configured, e.g. SCell dormancy indication field in DCI format 1_1.

If one-shot HARQ-ACK request is set to '1', one-shot feedback is triggered, while SCell dormancy switching can still be indicated by the DCI format 1_1.

If FDRA indicate a valid frequency resource, PDSCH transmission is scheduled and SCell dormancy switching is indicated by an indicator X, if configured, e.g. SCell dormancy indication field.

Otherwise, if special value of FDRA is indicated, PDSCH transmission is not scheduled and whether SCell dormancy switching is applicable is indicated by an indicator Y in DCI format 1_1.

In one option, at least one field from New data indicator of transport block 1 and DMRS sequence initialization is not used for per SCell dormancy indication, which could be used as indicator Y, for example, DMRS sequence initialization is reused as indicator Y. If the value of indicator Y is '1', the above fields are repurposed as enabler for SCell dormancy switching indication.

In one option, the field of Redundancy version of transport block 1 is not used for per SCell dormancy indication, which could be used as indicator Y, a special code point of indicator Y, e.g. '11', are repurposed as enabler for SCell dormancy switching indication.

The above operations are summarized in Table 3.

TABLE 3

Indication of one-shot feedback and SCell dormancy switching

| FDRA | DCI one-shot request | Data transmission | One-shot feedback | Dormancy switching |
|---|---|---|---|---|
| Special value | 1 | NO | YES | By indicator Y + repurposed fields |
| valid FDRA | 1 | YES | YES | By indicator X, if configured |
| Special value | 0 | NO | NO | By repurposed fields |
| valid FDRA | 0 | YES | NO | By indicator X, if configured |

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for new-radio (NR) operations in a fifth-generation (5G) system (5GS), the apparatus comprising: processing circuitry; and memory, wherein for shared spectrum operation, the processing circuitry configured to:
    detect a downlink-control information (DCI) format 1_1, the DCI format 1_1 including a frequency domain resource assignment (FDRA) field;
    determine whether the DCI format 1_1 includes a one-shot hybrid automatic repeat request acknowledgement (HARQ-ACK) request field;
    determine whether the DCI format 1_1 indicates that a physical downlink shared channel (PDSCH) reception is scheduled or whether the DCI format 1_1 indicates secondary cell (SCell) dormancy and the PDSCH reception is not actually scheduled based on the one-shot HARQ-ACK request field and bits of the FDRA field; and wherein when the one-shot HARQ-ACK request field indicates one-shot HARQ-ACK feedback, the processing circuitry is configured to:
interpret the DCI format 1_1 as scheduling the PDSCH reception and not indicating SCell dormancy when the bits of the FDRA field do not meet a predetermined configuration and multiplex a HARQ-ACK codebook in a physical uplink control channel (PUCCH) or physical uplink shared channel (PUSCH) for transmission; and
interpret the DCI format 1_1 as not scheduling the PDSCH reception and indicating SCell dormancy when the bits of the FDRA field meet the predetermined configuration,
wherein the memory is configured to store the DCI format 1_1.

2. The apparatus of claim 1, wherein the predetermined configuration for the bits of the FDRA field comprises for:
resource Allocation Type 0 when all bits of the frequency domain resource assignment field in the DCI format are equal to 0; and
resource Allocation Type 1 when all bits of the frequency domain resource assignment field in the DCI format are equal to 1.

3. The apparatus of claim 2, wherein when the one-shot HARQ-ACK request field indicates one-shot HARQ-ACK feedback and when the DCI format 1_1 is interpreted as scheduling the PDSCH reception and not indicating SCell dormancy, the processing circuitry is configured to encode a HARQ-ACK transmission on the PUCCH to include HARQ-ACK feedback for PDSCH transmissions for HARQ processes of a cell.

4. The apparatus of claim 3, wherein when the DCI format 1_1 is interpreted as not scheduling the PDSCH reception and indicating the SCell dormancy: an activated SCell is switched into a dormant bandwidth part (BWP); or a dormant SCell is switched into a non-dormant BWP.

5. The apparatus of claim 4, wherein for the shared spectrum operation when the DCI format 1_1 is interpreted as scheduling the PDSCH reception and not indicating SCell dormancy, the processing circuitry is configured to encode the HARQ-ACK transmission on the PUCCH on an unlicensed carrier after performing a listen-before-talk (LBT) process.

6. The apparatus of claim 4, wherein when the DCI format 1_1 is interpreted as scheduling the PDSCH reception and not indicating SCell dormancy and when the one-shot HARQ-ACK request field has a value of '1', the one-shot HARQ-ACK feedback is triggered, and wherein when the one-shot HARQ-ACK request field has a value of '0', the one-shot HARQ-ACK feedback is not triggered.

7. A non-transitory computer-readable storage medium that stores instructions for execution by processing circuitry of a user equipment (UE) configured for new-radio (NR) operations in a fifth-generation (5G) system (5GS), wherein for shared spectrum operation, the processing circuitry configured to:
detect a downlink-control information (DCI) format 1_1, the DCI format 1_1 including a frequency domain resource assignment (FDRA) field;
determine whether the DCI format 1_1 includes a one-shot hybrid automatic repeat request acknowledgement (HARQ-ACK) request field;
determine whether the DCI format 1_1 indicates that a physical downlink shared channel (PDSCH) reception is scheduled or whether the DCI format 11 indicates secondary cell (SCell) dormancy and the PDSCH reception is not actually scheduled based on the one-shot HARQ-ACK request field and bits of the FDRA field; and
wherein when the one-shot HARQ-ACK request field indicates one-shot HARQ-ACK feedback, the processing circuitry is configured to:
interpret the DCI format 1_1 as scheduling the PDSCH reception and not indicating SCell dormancy when the bits of the FDRA field do not meet a predetermined configuration and multiplex a HARQ-ACK codebook in a physical uplink control channel (PUCCH) or physical uplink shared channel (PUSCH) for transmission; and
interpret the DCI format 1_1 as not scheduling the PDSCH reception and indicating SCell dormancy when the bits of the FDRA field meet the predetermined configuration.

8. The non-transitory computer-readable storage medium of claim 7, wherein the predetermined configuration for the bits of the FDRA field comprises for:
resource Allocation Type 0 when all bits of the frequency domain resource assignment field in the DCI format are equal to 0; and
resource Allocation Type 1 when all bits of the frequency domain resource assignment field in the DCI format are equal to 1.

9. The non-transitory computer-readable storage medium of claim 8, wherein when the one-shot HARQ-ACK request field indicates one-shot HARQ-ACK feedback and when the DCI format 1_1 is interpreted as scheduling the PDSCH reception and not indicating SCell dormancy, the processing circuitry is configured to encode a HARQ-ACK transmission on the PUCCH to include HARQ-ACK feedback for PDSCH transmissions for HARQ processes of a cell.

10. The non-transitory computer-readable storage medium of claim 9, wherein when the DCI format 1_1 is interpreted as not scheduling the PDSCH reception and indicating the SCell dormancy: an activated SCell is switched into a dormant bandwidth part (BWP); or a dormant SCell is switched into a non-dormant BWP.

11. The non-transitory computer-readable storage medium of claim 10, wherein for unlicensed spectrum operation when the DCI format 1_1 is interpreted as scheduling the PDSCH reception and not indicating SCell dormancy, the processing circuitry is configured to encode the HARQ-ACK transmission on the PUCCH on an unlicensed carrier after performing a listen-before-talk (LBT) process.

12. The non-transitory computer-readable storage medium of claim 10, wherein when the DCI format 1_1 is interpreted as scheduling the PDSCH reception and not indicating SCell dormancy and when the one-shot HARQ-ACK request field has a value of '1', the one-shot HARQ-ACK feedback is triggered, and wherein when the one-shot HARQ-ACK request field has a value of '0', the one-shot HARQ-ACK feedback is not triggered.

13. An apparatus of a generation node B (gNB) configured for new-radio (NR) operations in a fifth-generation (5G) system (5GS), the apparatus comprising: processing circuitry; and memory, the processing circuitry configured to:
encode a downlink-control information (DCI) format 1_1 for transmission to a user equipment (UE), the DCI format 1_1 including a frequency domain resource assignment (FDRA) field,
wherein the processing circuitry is to encode the DCI format 1_1 to:

include a one-shot hybrid automatic repeat request acknowledgement (HARQ-ACK) request field to trigger one-shot HARQ-ACK feedback; and indicate whether a physical downlink shared channel (PDSCH) reception is scheduled by the DCI format 1_1 and whether secondary cell (SCell) dormancy is indicated based on the one-shot HARQ-ACK request field and bits of the FDRA field, wherein when the one-shot HARQ-ACK request field indicates one-shot HARQ-ACK feedback;

the DCI format 1_1 is to be interpreted as scheduling the PDSCH reception and not indicating SCell dormancy when the bits of the FDRA field do not meet a predetermined configuration and the processing circuitry is configured to decode a physical uplink control channel (PUCCH) or physical uplink shared channel (PUSCH) for transmission that includes a HARQ-ACK codebook, multiplexed by the UE; and the DCI format 1_1 is interpreted as not scheduling the PDSCH reception and indicating SCell dormancy when the bits of the FDRA field meet the predetermined configuration, wherein the memory is configured to store the DCI format 1_1.

14. The apparatus of claim 13, wherein the predetermined configuration for the bits of the FDRA field comprises for:

resource Allocation Type 0 when all bits of the frequency domain resource assignment field in the DCI format are equal to 0; and resource Allocation Type 1 when all bits of the frequency domain resource assignment field in the DCI format are equal to 1.

15. The apparatus of claim 14, wherein when the one-shot HARQ-ACK request field indicates one-shot HARQ-ACK feedback and when the DCI format 1_1 is interpreted as scheduling the PDSCH reception and not indicating SCell dormancy, the processing circuitry is configured to decode a HARQ-ACK transmission received on the PUCCH that includes HARQ-ACK feedback for PDSCH transmissions for HARQ processes of a cell.

16. The apparatus of claim 15, wherein when the DCI format 1_1 is interpreted as not scheduling the PDSCH reception and indicating the SCell dormancy, the processing circuitry is configured to:

switch an activated SCell into a dormant bandwidth part (BWP); or switch a dormant SCell into a non-dormant BWP.

17. The apparatus of claim 16, wherein for shared spectrum operation when the DCI format 1_1 is interpreted as scheduling the PDSCH reception and not indicating SCell dormancy, the processing circuitry is configured to encode the DCI format 1_1 for transmission on a physical downlink control channel (PDCCH) on an unlicensed carrier after performing a listen-before-talk (LBT) process.

18. The apparatus of claim 16, wherein when the DCI format 1_1 is interpreted as scheduling the PDSCH reception and not indicating SCell dormancy and when the one-shot HARQ-ACK request field has a value of '1', the one-shot HARQ-ACK feedback is triggered, and wherein when the one-shot HARQ-ACK request field has a value of '0', the one-shot HARQ-ACK feedback is not triggered.

* * * * *

UNITED STATES PATENT AND TRADEMARK OFFICE
CERTIFICATE OF CORRECTION

PATENT NO. : 11,838,915 B2  
APPLICATION NO. : 17/172606  
DATED : December 5, 2023  
INVENTOR(S) : Li et al.

Page 1 of 1

It is certified that error appears in the above-identified patent and that said Letters Patent is hereby corrected as shown below:

In the Claims

In Column 15, Line 66, in Claim 6, delete "11" and insert --1_1-- therefor

Signed and Sealed this  
Eleventh Day of February, 2025

Coke Morgan Stewart  
*Acting Director of the United States Patent and Trademark Office*